US011697505B2

(12) United States Patent
Thomassin et al.

(10) Patent No.: US 11,697,505 B2
(45) Date of Patent: Jul. 11, 2023

(54) DISTRIBUTED PROPULSION CONFIGURATIONS FOR AIRCRAFT HAVING MIXED DRIVE SYSTEMS

(71) Applicant: Pratt & Whitney Canada Corp., Longueuil (CA)

(72) Inventors: Jean Thomassin, Ste Julie (CA); Eric LaTulipe, Sainte-Julie (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 16/708,636

(22) Filed: Dec. 10, 2019

(65) Prior Publication Data

US 2020/0277065 A1 Sep. 3, 2020

Related U.S. Application Data

(60) Provisional application No. 62/821,367, filed on Mar. 20, 2019, provisional application No. 62/812,315, filed on Mar. 1, 2019.

(51) Int. Cl.
*B64D 27/24* (2006.01)
*B64D 27/06* (2006.01)
*B64D 27/12* (2006.01)
*B64D 27/02* (2006.01)

(52) U.S. Cl.
CPC ............. *B64D 27/24* (2013.01); *B64D 27/06* (2013.01); *B64D 27/12* (2013.01); *B64D 2027/026* (2013.01)

(58) Field of Classification Search
CPC .. B64D 27/24; B64D 2027/026; B64D 27/02; B64D 2221/00; B64D 41/00; B64D 27/10; B64D 27/12; B64D 35/02
See application file for complete search history.

(56) References Cited

U.S. PATENT DOCUMENTS

| 6,179,072 B1 | 1/2001 | Hou |
| 6,198,183 B1 | 3/2001 | Baeumel et al. |
| 6,335,581 B1 | 1/2002 | Warnke |
| 6,427,441 B2 | 8/2002 | Wustefeld et al. |
| 6,537,047 B2 | 3/2003 | Walker |
| 6,692,395 B2 | 2/2004 | Rodeghiero et al. |
| 7,022,042 B2 | 4/2006 | Fleytman |
| 7,098,569 B2 | 8/2006 | Ong et al. |
| 7,247,967 B2 | 7/2007 | Ionel et al. |

(Continued)

FOREIGN PATENT DOCUMENTS

| BR | MU8701724 U2 | 6/2009 |
| BR | PI0702882 A2 | 3/2011 |

(Continued)

OTHER PUBLICATIONS

International Search Report and Written Opinion for PCT Application No. PCT/US2019/065345, dated Apr. 9, 2020.

*Primary Examiner* — Assres H Woldemaryam
(74) *Attorney, Agent, or Firm* — Norton Rose Fulbirght Canada LLP.

(57) ABSTRACT

An aircraft propulsion system is disclosed that includes at least one hybrid-electric powerplant for delivering power to an air mover for propelling the aircraft, wherein the at least one hybrid-electric powerplant includes a heat engine and an electric motor arranged in a parallel drive configuration or an in-line drive configuration.

21 Claims, 9 Drawing Sheets

(56) References Cited

U.S. PATENT DOCUMENTS

| | | |
|---|---|---|
| 7,303,497 B1 | 12/2007 | Wige |
| 7,316,629 B2 | 1/2008 | Nakagawa et al. |
| 7,345,398 B2 | 3/2008 | Purvines et al. |
| 7,398,946 B1 | 7/2008 | Marshall |
| 7,418,820 B2 | 9/2008 | Harvey et al. |
| 7,471,026 B2 | 12/2008 | Bender |
| 7,503,173 B2 | 3/2009 | Dong et al. |
| 7,726,426 B2 | 6/2010 | Beck et al. |
| 7,827,787 B2 | 11/2010 | Cherney et al. |
| 7,867,122 B2 | 1/2011 | Jones |
| 7,958,725 B2 | 6/2011 | Elliott |
| 8,217,544 B2 | 7/2012 | Osada et al. |
| 8,342,995 B2 | 1/2013 | Grant |
| 8,382,635 B2 | 2/2013 | Tampieri |
| 8,435,156 B2 | 5/2013 | Christ |
| 8,446,121 B1 | 5/2013 | Parsa et al. |
| 8,471,429 B2 | 6/2013 | Kaiser et al. |
| 8,495,870 B2 | 7/2013 | Sumiyoshi et al. |
| 8,531,076 B2 | 9/2013 | Stabenow et al. |
| 8,535,197 B2 | 9/2013 | Scekic |
| 8,584,452 B2 | 11/2013 | Lloyd |
| 8,596,054 B2 | 12/2013 | Law et al. |
| 8,621,860 B2 | 1/2014 | Hennemann et al. |
| 8,622,859 B2 | 1/2014 | Babbitt et al. |
| 8,660,761 B2 | 2/2014 | Anderson et al. |
| 8,663,047 B2 | 3/2014 | Schroth et al. |
| 8,710,786 B1 | 4/2014 | Parsa et al. |
| 8,747,267 B2 | 6/2014 | Sutherland |
| 8,915,812 B2 | 12/2014 | Haglsperger et al. |
| 8,943,820 B2 | 2/2015 | Carlton et al. |
| 8,967,532 B2 | 3/2015 | Vialle |
| 9,039,566 B2 | 5/2015 | Rudy |
| 9,051,996 B2 | 6/2015 | During et al. |
| 9,096,230 B2 | 8/2015 | Ries et al. |
| 9,102,223 B2 | 8/2015 | Greenwood |
| 9,109,682 B2 | 8/2015 | Lee et al. |
| 9,206,885 B2 | 12/2015 | Rekow et al. |
| 9,261,182 B2 | 2/2016 | Kato et al. |
| 9,303,727 B2 | 4/2016 | Reimann et al. |
| 9,343,939 B2 | 5/2016 | Schutten et al. |
| 9,401,631 B2 | 7/2016 | Wu et al. |
| 9,447,858 B2 | 9/2016 | Weeramantry et al. |
| 9,458,864 B2 | 10/2016 | Hyon et al. |
| 9,546,468 B2 | 1/2017 | Bang |
| 9,551,400 B2 | 1/2017 | Hiasa et al. |
| 9,683,585 B2 | 6/2017 | Akiyama et al. |
| 9,735,638 B2 | 8/2017 | Herz et al. |
| 9,751,614 B1* | 9/2017 | Nguyen .................. B64C 15/02 |
| 9,963,855 B2 | 5/2018 | Jagoda |
| 9,976,437 B2 | 5/2018 | McCune et al. |
| 10,000,275 B2 | 6/2018 | Tendola et al. |
| 10,024,341 B2 | 7/2018 | Zhang et al. |
| 10,086,946 B1 | 10/2018 | Zywiak et al. |
| 10,122,227 B1 | 11/2018 | Long |
| 10,145,291 B1 | 12/2018 | Thomassin et al. |
| 10,183,744 B2 | 1/2019 | Gamble |
| 10,287,917 B2 | 5/2019 | Schwarz et al. |
| 10,374,477 B2 | 8/2019 | Niergarth et al. |
| 10,737,759 B2* | 8/2020 | Moxon .................. B64D 27/12 |
| 2005/0178893 A1 | 8/2005 | Miller et al. |
| 2005/0258306 A1 | 11/2005 | Barocela et al. |
| 2006/0016196 A1 | 1/2006 | Epstein |
| 2006/0016197 A1 | 1/2006 | Epstein |
| 2006/0056971 A1 | 3/2006 | D'Anna |
| 2006/0237583 A1 | 10/2006 | Fucke et al. |
| 2007/0170307 A1 | 7/2007 | de la Cierva Hoces |
| 2007/0264124 A1 | 11/2007 | Mueller et al. |
| 2008/0141921 A1 | 6/2008 | Hinderks |
| 2008/0145221 A1 | 6/2008 | Sun et al. |
| 2009/0050103 A1 | 2/2009 | Heaton |
| 2009/0229897 A1 | 9/2009 | Yutani et al. |
| 2010/0264724 A1 | 10/2010 | Nelson et al. |
| 2010/0285747 A1 | 11/2010 | Bauer et al. |
| 2011/0215584 A1 | 9/2011 | Prokopich |
| 2011/0236218 A1 | 9/2011 | Russ et al. |
| 2011/0243566 A1 | 10/2011 | Truong |
| 2011/0256973 A1 | 10/2011 | Werner et al. |
| 2011/0266995 A1 | 11/2011 | Winfield et al. |
| 2012/0025032 A1 | 2/2012 | Hopdjanian et al. |
| 2012/0137684 A1 | 6/2012 | Yogev et al. |
| 2012/0168557 A1 | 7/2012 | Edelson et al. |
| 2012/0227389 A1 | 9/2012 | Hinderks |
| 2012/0239228 A1 | 9/2012 | Vos |
| 2012/0327921 A1 | 12/2012 | Schirrmacher et al. |
| 2013/0026304 A1 | 1/2013 | Wang |
| 2013/0082135 A1 | 4/2013 | Moret |
| 2013/0119841 A1 | 5/2013 | Graf et al. |
| 2013/0168489 A1 | 7/2013 | McIntee |
| 2013/0181088 A1 | 7/2013 | Casado Montero et al. |
| 2013/0213048 A1* | 8/2013 | Stucki .................. F02B 37/105 |
| | | 60/772 |
| 2013/0227950 A1 | 9/2013 | Anderson et al. |
| 2013/0287574 A1 | 10/2013 | Ebbesen et al. |
| 2013/0300120 A1 | 11/2013 | Podrog |
| 2013/0341934 A1 | 12/2013 | Kawanishi |
| 2014/0010652 A1 | 1/2014 | Suntharalingam et al. |
| 2014/0027568 A1 | 1/2014 | Fleddermann et al. |
| 2014/0054411 A1 | 2/2014 | Connaulte et al. |
| 2014/0117148 A1 | 5/2014 | Dyrla et al. |
| 2014/0203739 A1 | 7/2014 | Chantriaux et al. |
| 2014/0248168 A1 | 9/2014 | Chantriaux et al. |
| 2014/0283519 A1 | 9/2014 | Mariotto et al. |
| 2014/0318132 A1 | 10/2014 | Podrog |
| 2015/0028594 A1 | 1/2015 | Mariotto |
| 2015/0076949 A1 | 3/2015 | Alim |
| 2015/0083852 A1 | 3/2015 | Moser et al. |
| 2015/0144742 A1* | 5/2015 | Moxon .................. B64D 27/10 |
| | | 244/215 |
| 2015/0151844 A1 | 6/2015 | Anton et al. |
| 2015/0183424 A1* | 7/2015 | Kim ....................... B60W 10/11 |
| | | 180/65.265 |
| 2015/0274306 A1 | 10/2015 | Sheridan |
| 2015/0311755 A1 | 10/2015 | Hiebl et al. |
| 2016/0010589 A1 | 1/2016 | Rolt |
| 2016/0016670 A1 | 1/2016 | Sautreuil et al. |
| 2016/0076446 A1 | 3/2016 | Bailey Noval et al. |
| 2016/0194087 A1* | 7/2016 | Nalim ...................... F02C 5/11 |
| | | 60/784 |
| 2016/0218930 A1 | 7/2016 | Toilion et al. |
| 2016/0244158 A1* | 8/2016 | Fredericks ............. B64C 25/52 |
| 2016/0305470 A1 | 10/2016 | Remer et al. |
| 2016/0332741 A1* | 11/2016 | Moxon .................. B64D 33/04 |
| 2017/0016398 A1 | 1/2017 | Thiriet et al. |
| 2017/0016399 A1 | 1/2017 | Bedrine et al. |
| 2017/0072755 A1 | 3/2017 | Zhou et al. |
| 2017/0096233 A1 | 4/2017 | Mercier-Calvairac et al. |
| 2017/0152055 A1 | 6/2017 | Mercier-Calvairac et al. |
| 2017/0203839 A1 | 7/2017 | Giannini et al. |
| 2017/0240273 A1 | 8/2017 | Yuen |
| 2017/0241347 A1 | 8/2017 | Marconi et al. |
| 2017/0284408 A1 | 10/2017 | Ricordeau et al. |
| 2017/0305541 A1 | 10/2017 | Vallart et al. |
| 2017/0320585 A1* | 11/2017 | Armstrong ............. B64C 27/24 |
| 2017/0327219 A1* | 11/2017 | Alber ..................... B64C 29/02 |
| 2017/0328282 A1 | 11/2017 | Jensen et al. |
| 2017/0370344 A1 | 12/2017 | Kassianoff |
| 2018/0002025 A1 | 1/2018 | Lents et al. |
| 2018/0003071 A1 | 1/2018 | Lents et al. |
| 2018/0003072 A1 | 1/2018 | Lents et al. |
| 2018/0003109 A1 | 1/2018 | Lents et al. |
| 2018/0044028 A1* | 2/2018 | Takami .................. B64C 27/18 |
| 2018/0118335 A1 | 5/2018 | Gamble et al. |
| 2018/0127103 A1 | 5/2018 | Cantemir |
| 2018/0162525 A1* | 6/2018 | St. Clair ................... B64C 5/02 |
| 2018/0178920 A1* | 6/2018 | Swann ...................... F02C 9/54 |
| 2018/0194483 A1 | 7/2018 | Schwoller |
| 2018/0230844 A1* | 8/2018 | Vondrell ................ B64D 27/24 |
| 2018/0251226 A1 | 9/2018 | Fenny et al. |
| 2018/0252115 A1 | 9/2018 | Himmelmann et al. |
| 2018/0265206 A1 | 9/2018 | Himmelmann |
| 2018/0266329 A1 | 9/2018 | Mackin |
| 2018/0273197 A1 | 9/2018 | Chang et al. |
| 2018/0319483 A1 | 11/2018 | Mayer et al. |
| 2018/0327081 A1* | 11/2018 | Gartenberg ............. B64C 11/06 |

(56) References Cited

U.S. PATENT DOCUMENTS

| | | | |
|---|---|---|---|
| 2018/0339786 A1 | 11/2018 | Thomassin et al. | |
| 2018/0346111 A1 | 12/2018 | Karem et al. | |
| 2019/0118943 A1* | 4/2019 | Machin | B64C 39/024 |
| 2020/0017228 A1* | 1/2020 | Combs | B64D 31/02 |

FOREIGN PATENT DOCUMENTS

| | | | |
|---|---|---|---|
| BR | PI0622106 A2 | 12/2011 | |
| BR | PI1104839 A2 | 11/2012 | |
| EP | 2226487 A2 | 9/2010 | |
| EP | 2332235 A2 | 6/2011 | |
| EP | 2478608 A2 | 7/2012 | |
| EP | 2238362 B1 | 3/2015 | |
| EP | 3292041 A1 | 3/2018 | |
| EP | 3327526 A1 | 5/2018 | |
| EP | 3327527 A1 | 5/2018 | |
| EP | 3350895 A1 | 7/2018 | |
| EP | 3405654 A1 | 11/2018 | |
| EP | 3423354 A1 | 1/2019 | |
| JP | 2006231974 A | 9/2006 | |
| JP | 2006270778 A | 10/2006 | |
| JP | 2006290187 A | 10/2006 | |
| JP | 2007137423 A | 6/2007 | |
| JP | 4215012 B2 | 1/2009 | |
| JP | 2009534928 A | 9/2009 | |
| JP | 2011516334 A | 5/2011 | |
| JP | 4973256 B2 | 7/2012 | |
| JP | 2013193533 A | 9/2013 | |
| JP | 5415400 B2 | 2/2014 | |
| JP | 2014076771 A | 5/2014 | |
| JP | 2014159255 A | 9/2014 | |
| JP | 2015077089 A | 4/2015 | |
| JP | 2015077091 A | 4/2015 | |
| JP | 2015137092 A | 7/2015 | |
| JP | 5867219 B2 | 2/2016 | |
| JP | 2017074804 A | 4/2017 | |
| JP | 2017150665 A | 8/2017 | |
| JP | 6199496 B2 | 9/2017 | |
| JP | 2017165131 A | 9/2017 | |
| JP | 6213494 B2 | 10/2017 | |
| JP | 2017534514 A | 11/2017 | |
| JP | 6376042 B2 | 8/2018 | |
| JP | 6397447 B2 | 9/2018 | |
| JP | 6430885 B2 | 11/2018 | |
| JP | 6433492 B2 | 12/2018 | |
| KR | 20070039699 A | 4/2007 | |
| KR | 20080086714 A | 9/2008 | |
| KR | 20080005377 U | 11/2008 | |
| KR | 20090110373 A | 10/2009 | |
| KR | 20110032973 A | 3/2011 | |
| KR | 20110087661 A | 8/2011 | |
| KR | 20120140229 A | 12/2012 | |
| KR | 20130006379 A | 1/2013 | |
| KR | 101277645 B1 | 6/2013 | |
| KR | 20130142491 A | 12/2013 | |
| KR | 101438289 B1 | 9/2014 | |
| KR | 101572184 B1 | 11/2015 | |
| KR | 101659783 B1 | 9/2016 | |
| KR | 20160143599 A | 12/2016 | |
| KR | 20170004299 A | 1/2017 | |
| KR | 101713800 B1 | 3/2017 | |
| KR | 101797011 B1 | 11/2017 | |
| WO | 2007086213 A1 | 8/2007 | |
| WO | 2011005066 A2 | 1/2011 | |
| WO | 2011107718 A1 | 9/2011 | |
| WO | 2011144188 A1 | 11/2011 | |
| WO | 2014108125 A1 | 7/2014 | |
| WO | 2014134506 A1 | 9/2014 | |
| WO | 2015107368 A1 | 7/2015 | |
| WO | 2015145036 A1 | 10/2015 | |
| WO | 2016074600 A1 | 5/2016 | |
| WO | 2017114643 A1 | 7/2017 | |
| WO | 2018044757 A1 | 3/2018 | |
| WO | 2018106137 A2 | 6/2018 | |
| WO | 2018191769 A1 | 10/2018 | |
| WO | 2018211227 A1 | 11/2018 | |

* cited by examiner

DISTRIBUTED PROPULSION CONFIGURATIONS FOR AIRCRAFT HAVING MIXED DRIVE SYSTEMS

CROSS REFERENCE TO RELATED APPLICATIONS

This application claims the benefit of and priority to U.S. Provisional Patent Application No. 62/812,315, filed Mar. 1, 2019, and U.S. Provisional Patent Application No. 62/821,367, filed Mar. 20, 2019, the disclosures of each of which are hereby incorporated by reference in their entirety.

BACKGROUND OF THE INVENTION

1. Field of the Invention

The subject invention is directed to propulsion configurations in aircraft, and more particularly, to a series of distributed propulsion configurations for an aircraft having mixed drive systems, including hybrid-electric propulsion systems.

2. Description of Related Art

The level of air traffic continues to increase worldwide, leading to increased fuel consumption and air pollution. Consequently, efforts are underway to make aircraft more environmentally compatible through the use of specific types of fuel and/or by reducing fuel consumption through the use of more efficient drive systems.

For example, aircraft having mixed drive systems that include a combination of various types of engines are known for reducing pollutants and increasing efficiency. Some current combinations include reciprocating engines and jet engines, reciprocating engines and rocket engines, jet engines and rocket engines, or turbojet engines and ramjet engines.

While these mixed drive systems are useful, they are not readily adaptable for use on commercial passenger aircraft. However, hybrid-electric propulsion systems that provide power through a combustion engine and an electric motor are indeed adaptable for use with commercial passenger aircraft and can provide efficiency benefits including reduced fuel consumption. The subject invention is directed to aircraft having such propulsion systems.

SUMMARY OF THE DISCLOSURE

The subject invention is directed to an aircraft propulsion system that includes at least one hybrid-electric powerplant for delivering power to an air mover for propelling the aircraft, wherein the at least one hybrid-electric powerplant includes a heat engine and an electric motor arranged in a parallel drive configuration or in an in-line drive configuration. The power delivery from the hybrid-electric powerplant can be about evenly split between the heat engine and the electric motor, or the power delivery from the hybrid-electric powerplant can be proportionally split between the heat engine and the electric motor.

It is envisioned that the heat engine could be configured as a rotary engine, a reciprocating engine of any fuel type with a configuration of turbomachinery elements, selected from a group consisting of a turbocharger, turbo-supercharger, or supercharger and exhaust recovery turbo compounding, which is mechanically, electrically, hydraulically or pneumatically driven.

In one embodiment, at least one hybrid-electric powerplant is associated with each wing of the aircraft. By way of example, three hybrid-electric powerplants may be distributed along each wing of the aircraft, with one hybrid-electric powerplant located on each wing tip, another hybrid-electric powerplant located at outboard location on each wing and a third hybrid-electric powerplant located at an inboard location on each wing. It is also envisioned that a hybrid-electric powerplant may be associated with the tail section of the aircraft.

The subject invention is also directed to an aircraft propulsion system that includes at least one electric powerplant and at least one combustion powerplant, wherein each powerplant delivers power to a respective air mover for propelling the aircraft. In one embodiment, an inboard heat engine and an outboard electric motor are associated with each wing of the aircraft. In another embodiment, an inboard heat engine and two outboard electric motors are associated with each wing, and a heat motor is associated with the tail section of the aircraft.

In yet another embodiment, three electric motors are distributed along each wing of the aircraft, and a heat motor is associated with the tail section of the aircraft. In another embodiment, each wing has a heat motor located on the leading edge side of the wing and an electric motor located on the trailing edge side of the wing, or vice versa. In yet another embodiment, a heat engine and an electric motor are associated with the tail section of the aircraft.

It is envisioned that the aircraft propulsion system can further include at least one hybrid-electric powerplant that includes a heat engine and an electric motor arranged in a parallel drive configuration or in an in-line drive configuration for delivering power to an air mover for propelling the aircraft. In one embodiment of such a system an inboard hybrid-electric powerplant is associated with each wing, an outboard electric motor is associated with each wing, and a heat engine is associated with the tail section of the aircraft.

In another embodiment of such a system an inboard heat engine is associated with each wing, two outboard electric motors are associated with each wing, and a hybrid-electric powerplant is associated with the tail section of the aircraft. In yet another embodiment of such a system each wing has a heat motor located on the leading edge side of the wing and an electric motor located on the trailing edge side of the wing, and a hybrid-electric powerplant is associated with the tail section of the aircraft.

In accordance with the subject invention, it is envisioned that the propulsive power provided by a particular propulsion configuration to propel the aircraft could be evenly distributed amongst several powerplants of the propulsion system or the propulsive power provided by a particular propulsion configuration can be distributed proportionally amongst several powerplants of the propulsion system.

More particularly, the subject invention is directed to an aircraft propulsion system that includes a plurality of hybrid-electric powerplants for delivering power to respective air movers to propel the aircraft, wherein each hybrid-electric powerplant includes a heat engine and an electric motor that are arranged in a parallel drive configuration or in an in-line drive configuration. In certain embodiments, the propulsive power provided to the air movers is evenly distributed amongst the plurality of hybrid-electric powerplants, and in other embodiments the propulsive power provided to the air movers is proportionally distributed amongst the plurality of hybrid-electric powerplants.

The subject invention is also directed to an aircraft propulsion system that includes a plurality of powerplants for delivering power to respective air movers to propel the aircraft, wherein each powerplant includes a heat engine and/or an electric motor. In certain embodiments, the propulsive power provided to the air movers is evenly distributed amongst the plurality of powerplants, and in other embodiments the propulsive power provided to the air movers is proportionally distributed amongst the plurality powerplants.

These and other features of the aircraft propulsion systems of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those having ordinary skill in the art will readily understand how to make and use the subject invention without undue experimentation, preferred embodiments thereof will be described in detail herein below with reference to the figures wherein.

DETAILED DESCRIPTION OF THE PREFERRED EMBODIMENTS

Figure 1:
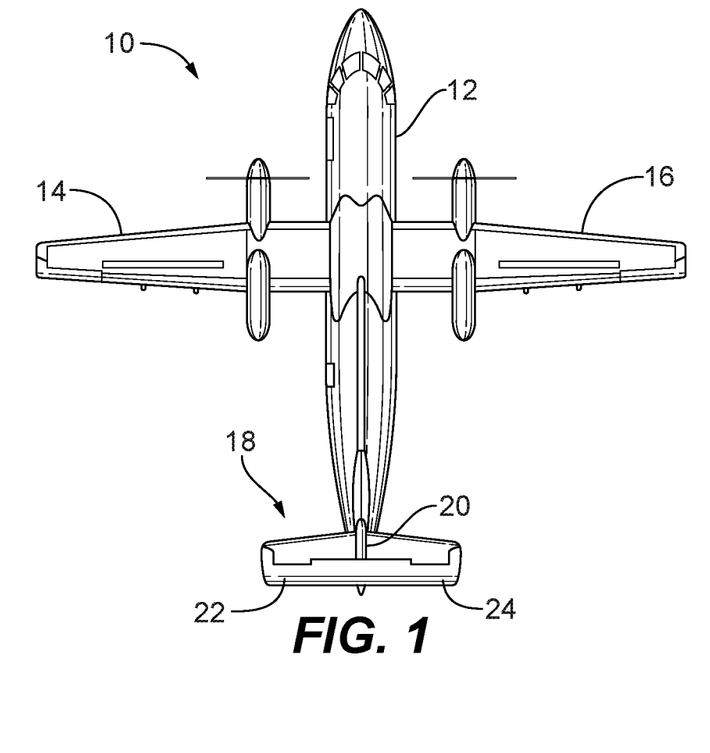
FIG. 1 is a top plan view of a commercial passenger aircraft with which an embodiment of a distributed propulsion system configured in accordance with the subject invention is deployed.
Figure 2:
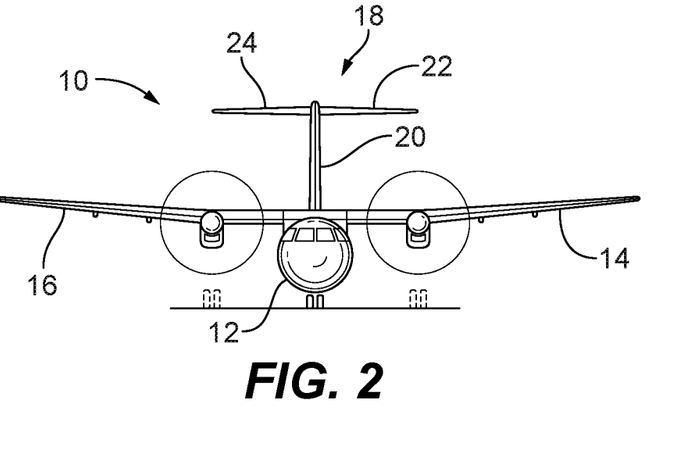
FIG. 2 is a front elevational view pf the aircraft illustrated in FIG. 1.
Figure 3:
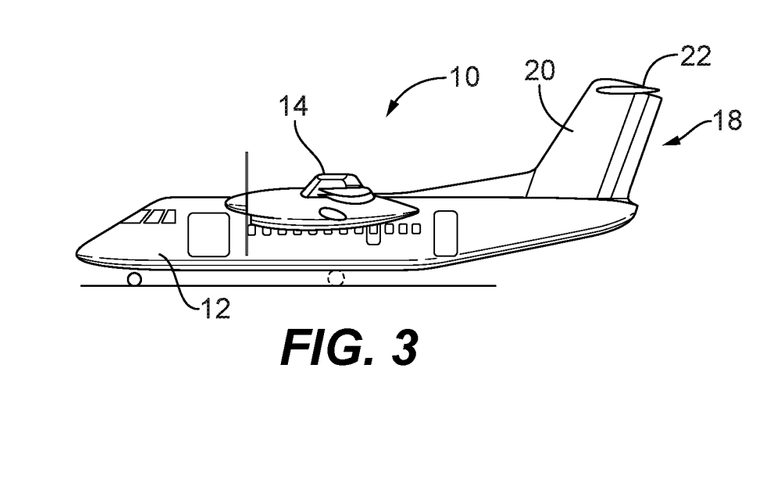
FIG. 3 is a left side front elevational view of the aircraft illustrated in FIG. 1.

Referring now to the drawings wherein like reference numerals identify similar structures or features of the subject invention, there illustrated in FIGS. 1 through 3 a commercial passenger aircraft 10 that includes a fuselage 12, left and right wings 14 and 16 and a tail section 18 that has a vertical stabilizer 20, which includes left and right horizontal stabilizers 22 and 24.

In the description that follows, the aircraft 10 may include one or more powerplant locations on each wing 14, 16, with these powerplant locations being numbered sequentially from left to right as is conventional, whereby the left-most powerplant location on wing 14 will always be designated herein as location number one. In certain embodiments described below, additional powerplants will be located in the tail section of the aircraft.

Figure 4:
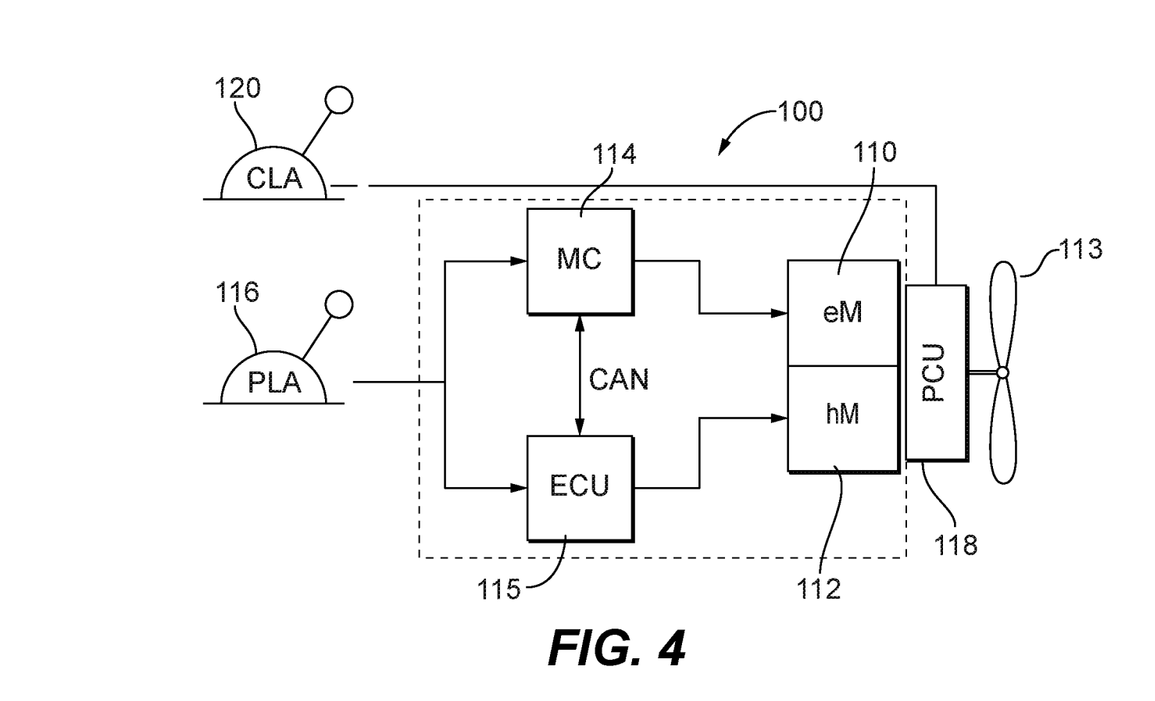
FIG. 4 is a schematic representation a hybrid-electric propulsion system deployed in several of the embodiments of the invention described herein, which includes an electric motor (eM) and a heat engine (hM) arranged in a parallel drive configuration.

In the description that follows, there will be certain propulsion configurations that include one or more Hybrid-Electric Powerplants (HEP). As shown in FIG. 4, each HEP is designated generally by reference numeral 100 and it includes an electric motor (eM) 110 and a heat engine or heat motor (hM) 112. The electric motor 110 and the heat engine 112 of each HEP are arranged in a parallel drive configuration. Alternatively, the electric motor 110 and the heat engine of each HEP are arranged in an in-line drive configuration. The power delivery from each HEP can be about evenly split between the electric motor 110 and the heat engine 112 (i.e., 50:50), or the power delivery from each HEP can be proportionally split between the electric motor 110 and the heat engine 112 (e.g., from 90:10 to 10:90).

A battery system provides energy to the electric motor 110 of the HEP, and it is envisioned that the battery system could be located within the fuselage 12 of the aircraft 10 and/or within the wings 14, 26 of the aircraft 10, or in other locations that provide the required installation space and adjacency of the used electrical power.

With continuing reference to FIG. 4, the HEP further includes a Motor Controller (MC) 114 and an Engine Control Unit (ECU) 115 which communicate with one another by way of a communication network such as a CAN Bus or the like. The HEP receives control input from the pilot by way of a Power Lever Angle (PLA) throttle 116 located on the flight deck of the aircraft 10. The HEP further includes a Propeller Control Unit (PCU) 118 for air mover or propeller 113 that receives input from the pilot by way of a Condition Lever Angle (CLA) throttle 120 located on the flight deck of the aircraft 10.

It is envisioned that the heat engine 112 of the HEP could be configured as a gas turbine, a spark ignited, a diesel, a rotary engine or a reciprocating engine of any fuel type with a configuration of turbomachinery elements, selected from a group consisting of a turbocharger, turbo-supercharger, or supercharger and exhaust recovery turbo compounding, which is mechanically, electrically, hydraulically or pneumatically driven. An example of a rotary engine suitable for such an application is disclosed in U.S. Pat. No. 10,145,291, the disclosure of which is herein incorporated by reference in its entirety.

In the description that follows, there will also be certain propulsion configurations that include one more powerplants that have only an electric motor (eM), one or more powerplants that have only a heat engine (hM), or one more powerplants that have a heat motor (hM) in a forward or leading edge position and an electric motor (eM) in an aft or trailing edge position, or vice versa. In some of these configuration a battery is required to provide power to the electric motor(s) and in other configurations a battery would be optional.

In accordance with the subject invention, it is envisioned that the propulsive power provided by the propulsion system to propel the aircraft can be evenly distributed amongst several powerplants of the propulsion system. Alternatively, the propulsive power provided by the propulsion system can be distributed proportionally amongst several powerplants of the propulsion system. In each instance, proportional propulsive power within a particular propulsion system would be achieved by selectively sizing the electric motors and/or heat engines to generate a desired amount of propulsive power.

Figure 5:
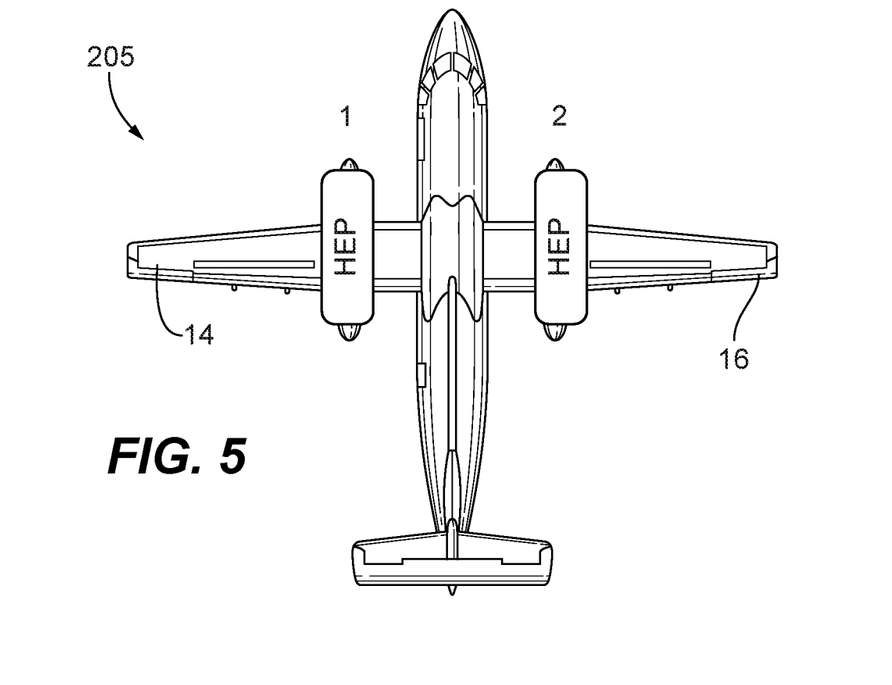
FIG. 5 is a schematic diagram of an aircraft having a single hybrid-electric propulsion system located on each wing, wherein a battery is required.

Referring to FIG. 5, there is illustrated an aircraft 205 having a single hybrid-electric propulsion system HEP located on each wing. More particularly, an HEP is located in position 1 on the left wing 14 of aircraft 205 for delivering power to an air mover to propel the aircraft 205, and an HEP is located in position 2 on the right wing 16 of aircraft 205 to deliver power to an air mover to propel the aircraft 205. Preferably, the propulsive power to propel aircraft 205 would be evenly distributed between the HEPs in positions 1 and 2.

In this configuration, a battery is required to provide power to the electric motors of the HEP on each wing. It is envisioned that in the event of a failure of one hM in one HEP, power from the healthy hM in the other HEP can be extracted with its associated eM and transferred to the eM of the HEP with the failed hM so as to balance load from one wing to the other. This power transfer concept can be extended to other embodiments of the invention presented herein below.

Figure 6:
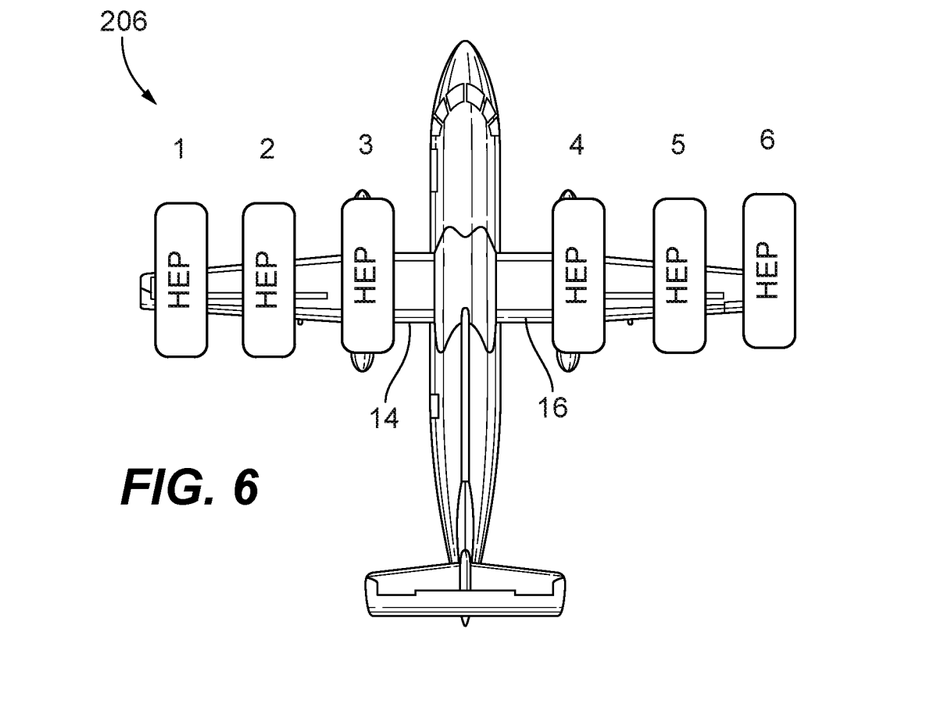
FIG. 6 is a schematic diagram of an aircraft having three hybrid-electric propulsion systems located on each wing, wherein a battery is required.

Referring to FIG. 6, there is illustrated an aircraft 206 having three HEP systems located on each wing. More particularly, an HEP is located in positions 1-3 on the left wing 14 of aircraft 206 to deliver power to respective air movers to propel the aircraft 206, and an HEP is located in positions 4-6 on the right wing 16 of aircraft 206 to deliver power to respective air movers to propel the aircraft 206.

The propulsive power to propel aircraft 206 could be evenly distributed amongst the powerplants in positions 1 through 6, or power could be proportionally distributed amongst the six powerplants. For example, the propulsive power generated by the HEP in the two outboard-most positions 1 and 6 could be proportionally less than the propulsive power generated by the HEP in each of the inboard positions 2 through 5. A battery is required to provide power to the electric motor in each of the six HEP positions of aircraft 206. In the event of a low battery or battery depletion condition, it is envisioned that one HEP could act as a generator. This power generation concept could be applied in other embodiments of the invention disclosed herein.

Figure 7:
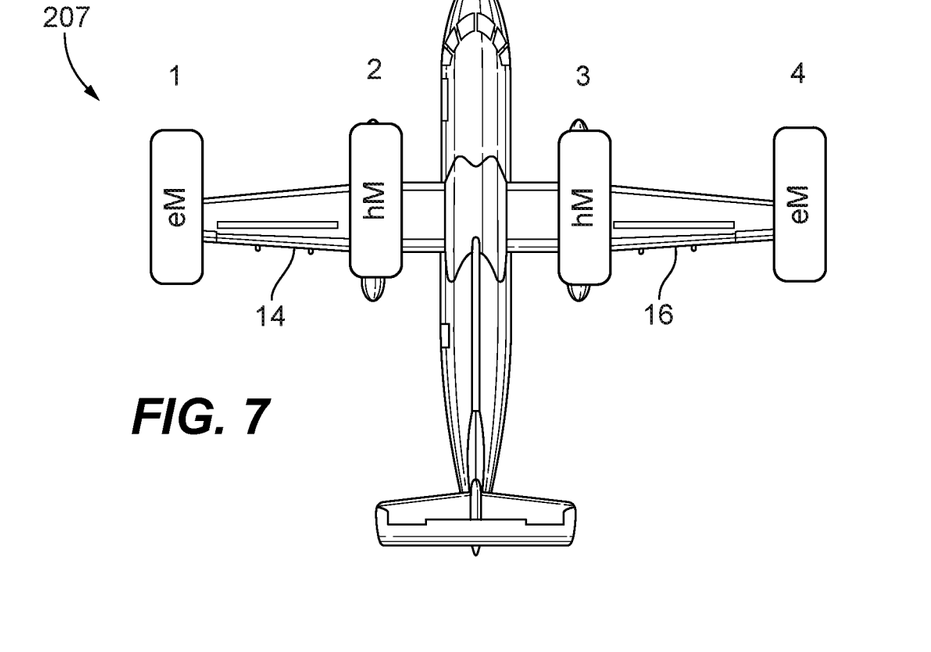
FIG. 7 is a schematic diagram of an aircraft having an inboard heat engine and an outboard electric motor located on each wing, wherein a battery is required.

Referring to FIG. 7, there is illustrated an aircraft 207 having an inboard heat engine hM and an outboard electric motor eM located on each wing. More particularly, an electric motor eM is located in position 1 on the left wing 14 of aircraft 207 and a heat engine hM is located in position 2 on the left wing 14 of aircraft 207. Similarly, a heat engine is located in position 3 on the right wing 16 of aircraft 207 and a heat engine hM is located in position 4 on the right wing 16 of aircraft 207. In this configuration, a battery is required to provide power to the electric motor eM on each wing of aircraft 207.

Figure 8:
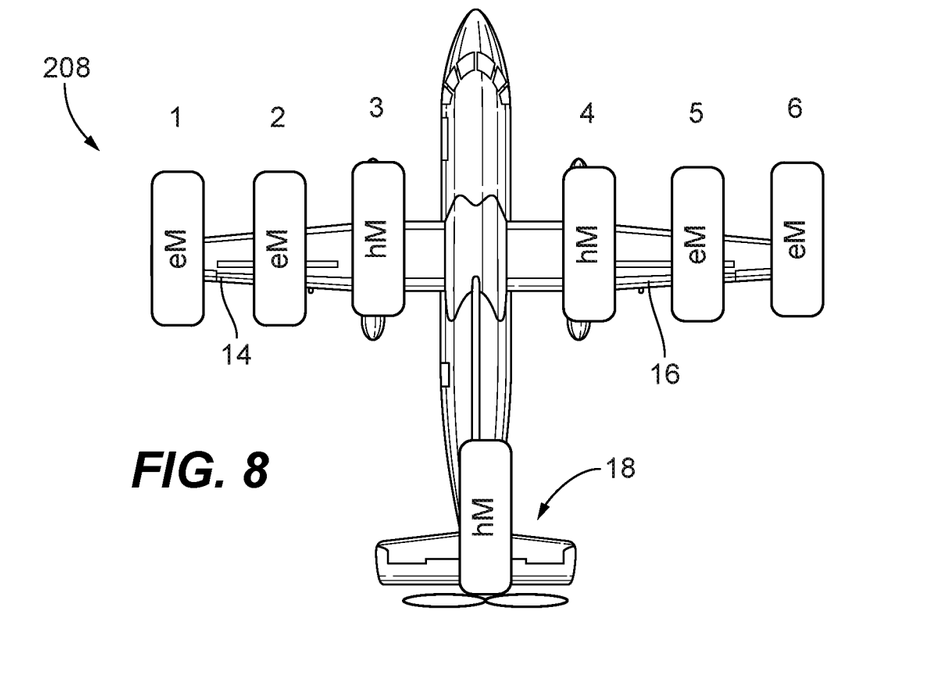
FIG. 8 is a schematic diagram of an aircraft having an inboard heat engine and two outboard electric motors located on each wing, and a heat engine associated with the tail section of the aircraft, wherein a battery is required.

Referring to FIG. 8, there is illustrated an aircraft 208 having two outboard electric motors eM at locations 1 and 2 on left wing 14 and an inboard heat engine hM at location 3 on left wing 14. Similarly, an inboard heat engine hM is located in position 4 on right wing 16 of aircraft 208 and two outboard electric motors eM are located in positions 5 and 6 on right wing 16 of aircraft 208. In addition, a heat engine hM is associated with the tail section 18 of the aircraft 208 for delivering power to a respective air mover. It is envisioned that an eM in this configuration could be used as a Ram Air Turbine (RAT) in case of an emergency. In this embodiment, a battery is required to provide power to each of the electric motors on each wing of aircraft 208.

Figure 9:
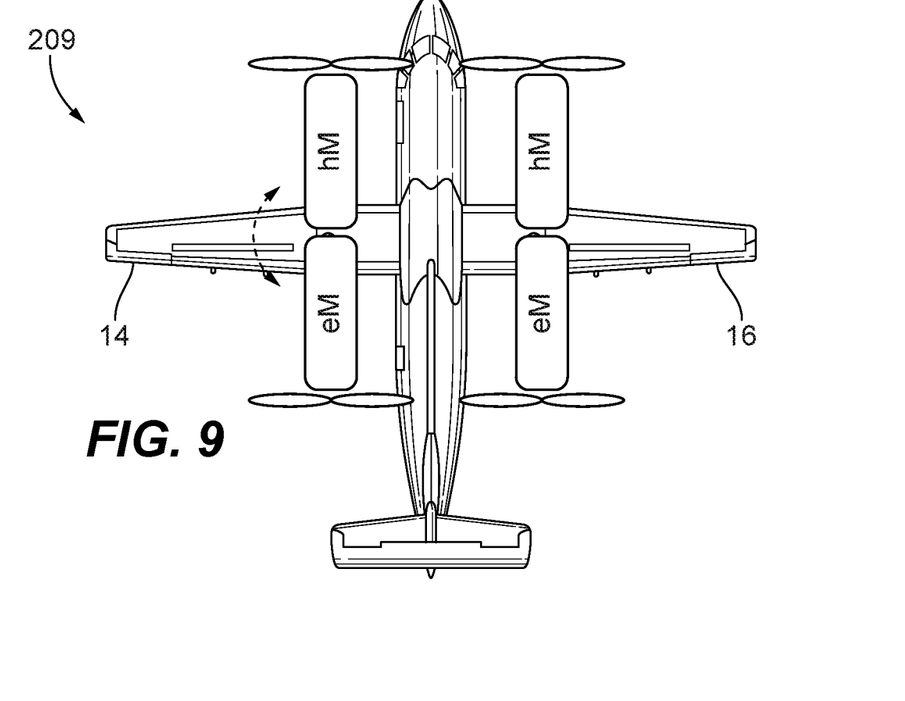
FIG. 9 is a schematic diagram of an aircraft wherein each wing has a heat motor located on the leading edge side of the wing and an electric motor located on the trailing edge side of the wing, and wherein a battery is required.

Referring to FIG. 9, there is illustrated an aircraft 209 having a heat motor hM located on the leading edge side of position 1 of the left wing 14 and an electric motor eM located on the trailing edge side of position 1 of the left wing 14. Similarly, a heat engine hM is located on the leading edge side of position 2 of the right wing 16 and an electric motor eM is located on the trailing edge side of position 2 of the right wing 16. In this embodiment of the invention, each heat engine and each electric motor delivers power to a respective air mover to propel the aircraft 209. It is also envisioned that the electric motors could be located on the leading edge side of wings and the heat engines could be located on the trailing side of each wing. In addition, a battery is required to provide power to each of the electric motors on each wing of aircraft 209.

Figure 10:
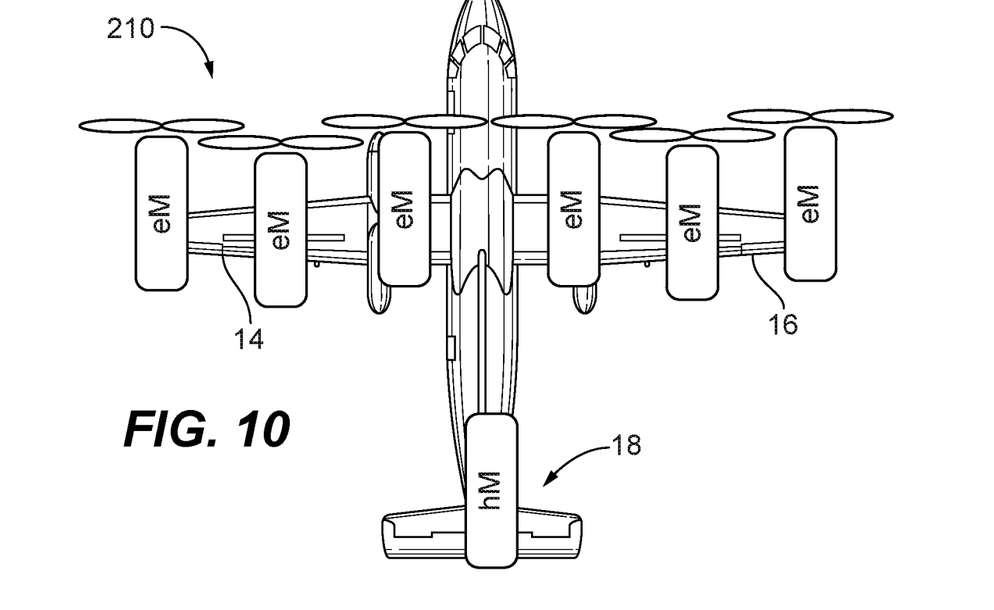
FIG. 10 is a schematic diagram of an aircraft having three electric motors distributed along each wing and having a heat engine associated with the tail section of the aircraft, wherein a battery is required.

Referring to FIG. 10, there is illustrated an aircraft 210 having three electric motors eM distributed along each wing of aircraft 210 and a heat engine hM associated with the tail section 18 of the aircraft 210. More particularly, an electric motor eM is located in positions 1-3 on the left wing 14 of aircraft 210 to deliver power to respective air movers to propel the aircraft 210, and an electric motor eM is located in positions 4-6 on the right wing 16 of aircraft 210 to deliver power to respective air movers to propel the aircraft 210. Those skilled in the art will readily appreciate that more than three electric motors can be distributed along each wing. For example, there could be four, five or even six or more electric motors distributed along each wing of an aircraft. In addition, in the propulsion configuration of aircraft 210, a heat engine hM is associated with the tail section 18 of the aircraft 210.

It is envisioned that the propulsive power to propel aircraft 210 could be evenly distributed amongst the electric motors (eM) located in positions 1 through 6, or power could be proportionally distributed amongst these six powerplants. For example, the propulsive power generated by the eM in the two outboard-most positions 1 and 6 could be proportionally less than the propulsive power generated by the eM in each of the inboard positions 2 through 5. A battery is required to provide power to the six electric motors of aircraft 210.

Figure 11:
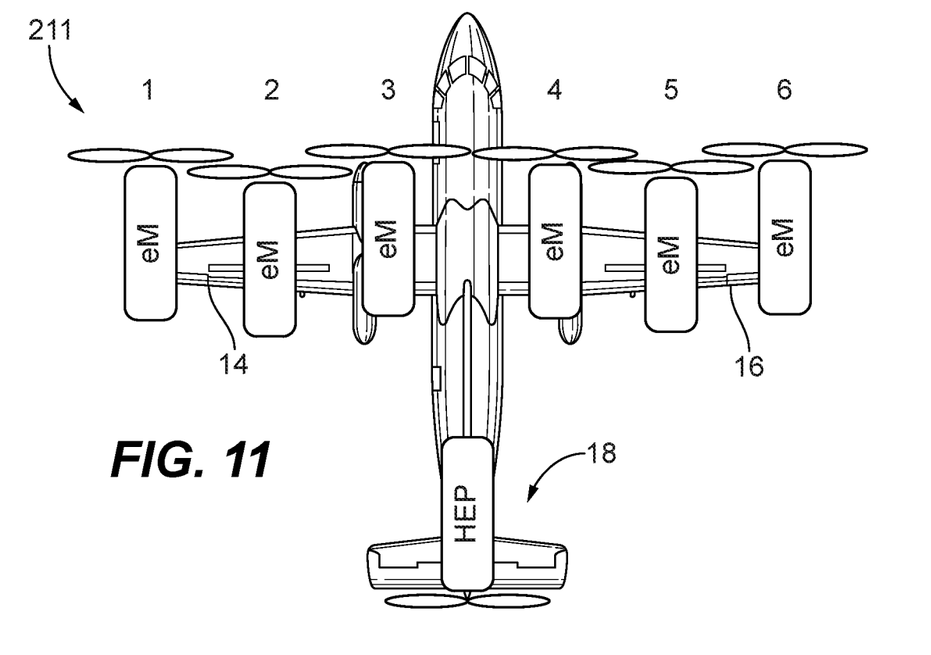
FIG. 11 is a schematic diagram of an aircraft having three electric motors distributed along each wing and having a hybrid-electric propulsion system associated with the tail section of the aircraft, wherein a battery is optional.

Referring to FIG. 11, there is illustrated an aircraft 211 having three electric motors eM distributed along each wing of aircraft 211 and a hybrid-electric propulsion system HEP associated with the tail section 18 of the aircraft 211. More particularly, an electric motor eM is located in positions 1 through 3 on the left wing 14 of aircraft 211 to deliver power to respective air movers to propel the aircraft 211, and an electric motor eM is located in positions 4 through 6 on the right wing 16 of aircraft 211 to deliver power to respective air movers to propel the aircraft 211. In addition, a hybrid-electric propulsion system HEP is associated with the tail section 18 of the aircraft 211. In this embodiment of the invention, propulsive power could be evenly distributed or proportionally distributed amongst each of the electric motors and it is envisioned that a battery would be optional.

Figure 12:
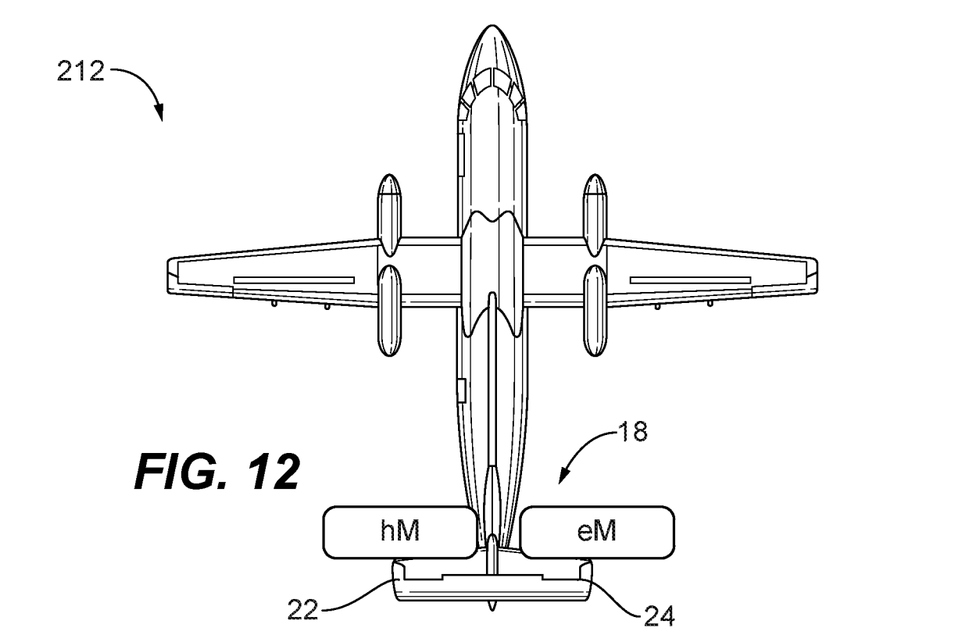
FIG. 12 is a schematic diagram of an aircraft having a heat engine and an electric motor associated with the tail section of the aircraft, wherein a battery is required.

Referring to FIG. 12, there is illustrated an aircraft 212 having a heat engine hM is associated with the left horizontal stabilizer 22 of the tail section 18 of aircraft 212 and an electric motor eM is associated with the right horizontal stabilizer 24 of the tail section 18 of aircraft 212. It is envisioned that propulsive power would be evenly distributed amongst the heat engine and the electric motor on aircraft 212. In this embodiment of the invention, a battery is required to provide power to the electric motor of aircraft 212.

Figure 13:
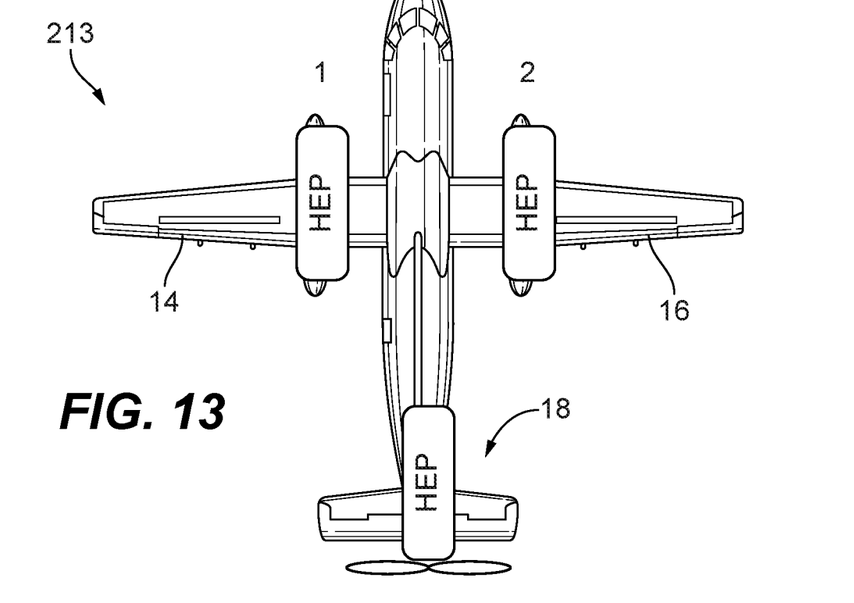
FIG. 13 is a schematic diagram of an aircraft having a hybrid-electric propulsion system on each wing and another hybrid-electric propulsion system associated with the tail section of the aircraft, wherein a battery is required.

Referring to FIG. 13, there is illustrated an aircraft 213 having a single hybrid-electric propulsion system HEP located on each wing and another hybrid-electric propulsion system HEP associated with the tail section 18 of aircraft 213. More particularly, an HEP is located in position 1 on the left wing 14 of aircraft 213 for delivering power to an air mover to propel the aircraft 213, and an HEP is located in position 2 on the right wing 16 of aircraft 213 to deliver power to an air mover to propel the aircraft 213. In addition, a third HEP is associated with the tail section 18 of aircraft 213 to deliver power to a respective air mover to propel the aircraft 213.

It is envisioned that propulsive power could be evenly distributed amongst each HEP on aircraft 213 or propulsive power could be proportionally distributed, whereby the HEP on each wing 14, 16 would provide more propulsive power than the third HEP located in the tail section 18 of aircraft 213. It is envisioned that the HEP in the tail section 18 of aircraft 213 could be adapted to generate engine power and transfer it to the on-wing HEPs. In this configuration, a battery is required to provide power to the electric motors in the HEP on each wing 14, 16 and in the tail section 18 of aircraft 213.

Figure 14:
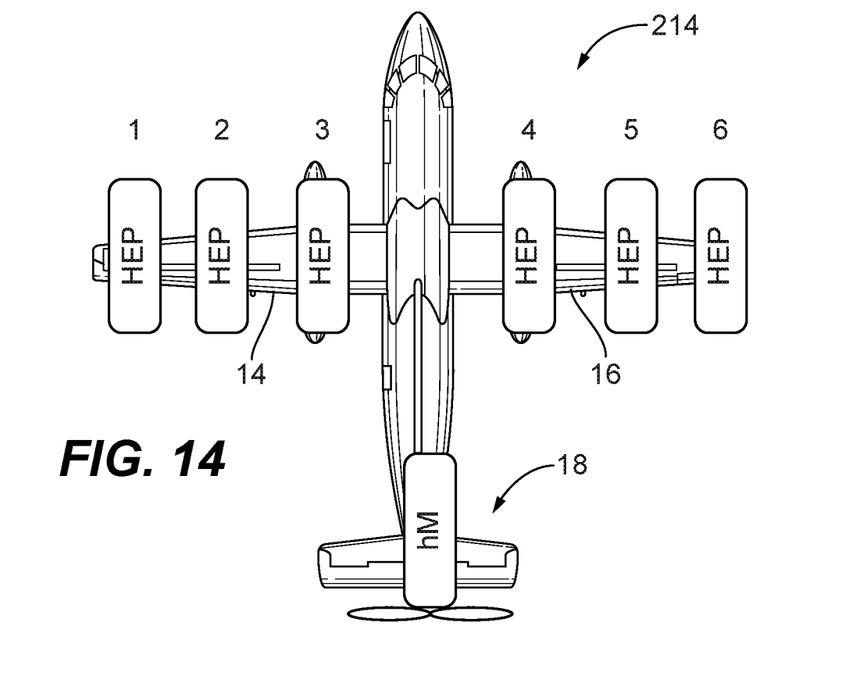
FIG. 14 is a schematic diagram of an aircraft having three hybrid-electric propulsion systems distributed along each wing and having another hybrid-electric propulsion system associated with the tail section of the aircraft, wherein a battery is required.

Referring to FIG. 14, there is illustrated an aircraft 214 having three HEP systems located on each wing and another hybrid-electric propulsion system HEP associated with the tail section 18 of aircraft 214. More particularly, an HEP is located in positions 1 through 3 on the left wing 14 of aircraft 214 to deliver power to respective air movers to propel the aircraft 214, and an HEP is located in positions 4 through 6 on the right wing 16 of aircraft 214 to deliver power to respective air movers to propel the aircraft 214. Those skilled in the art will readily appreciate that more than three HEP drive systems could be distributed along each wing. For example, there could be four, five or even six or more HEP drive systems distributed along each wing of an aircraft. In addition, on aircraft 214, a seventh HEP is located the tail section 18 of aircraft 214 to deliver power to a respective air mover to propel the aircraft 214.

It is envisioned that propulsive power on aircraft 214 could be evenly distributed amongst each HEP or propulsive power could be proportionally distributed amongst each HEP. For example, the HEP in the tail section 18 of aircraft 214 could provide proportionally less propulsive power than each other HEP located in the six positions of wings 14 and 16. In this configuration, a battery is required to provide power to the electric motors in the HEP on each wing 14, 16 and in the tail section 18 of aircraft 214. It is further envisioned, that in the event of a low battery or battery depletion condition, an HEP could act as a generator to supply electric power to the eM of another HEP on the aircraft 214.

Figure 15:
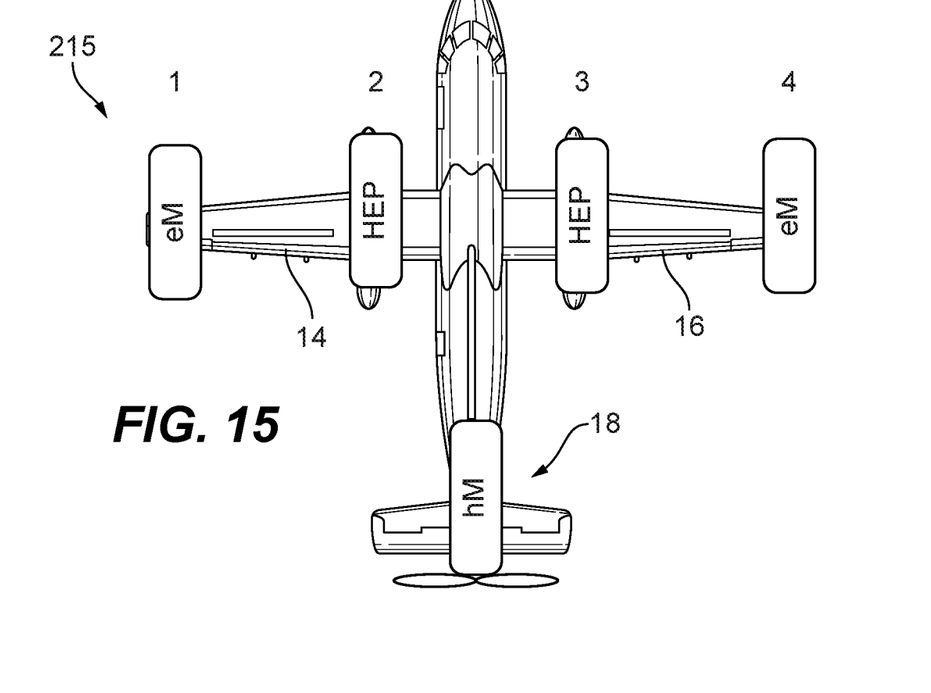
FIG. 15 is a schematic diagram of an aircraft having an inboard hybrid-electric propulsion system and an outboard electric motor located on each wing, and having a heat engine associated with the tail section of the aircraft, wherein a battery is optional.

Referring to FIG. 15, there is illustrated an aircraft 215 having an inboard hybrid-electric propulsion system HEP and an outboard electric motor eM located on each wing of aircraft 215. More particularly, an electric motor eM is located in position 1 on the left wing 14 of aircraft 215 and a hybrid-electric propulsion system HEP is located in position 2 on the left wing 14 of aircraft 215. Similarly, a hybrid-electric propulsion system HEP is located in position 3 on the right wing 16 of aircraft 215 and an electric motor eM is located in position 4 on the right wing 16 of aircraft 215. In addition, a heat engine hM is associated with the tail section 18 of the aircraft 215 to deliver power to a respective air mover to propel the aircraft 215. In this embodiment of the invention, it is envisioned that a battery would be optional.

Figure 16:
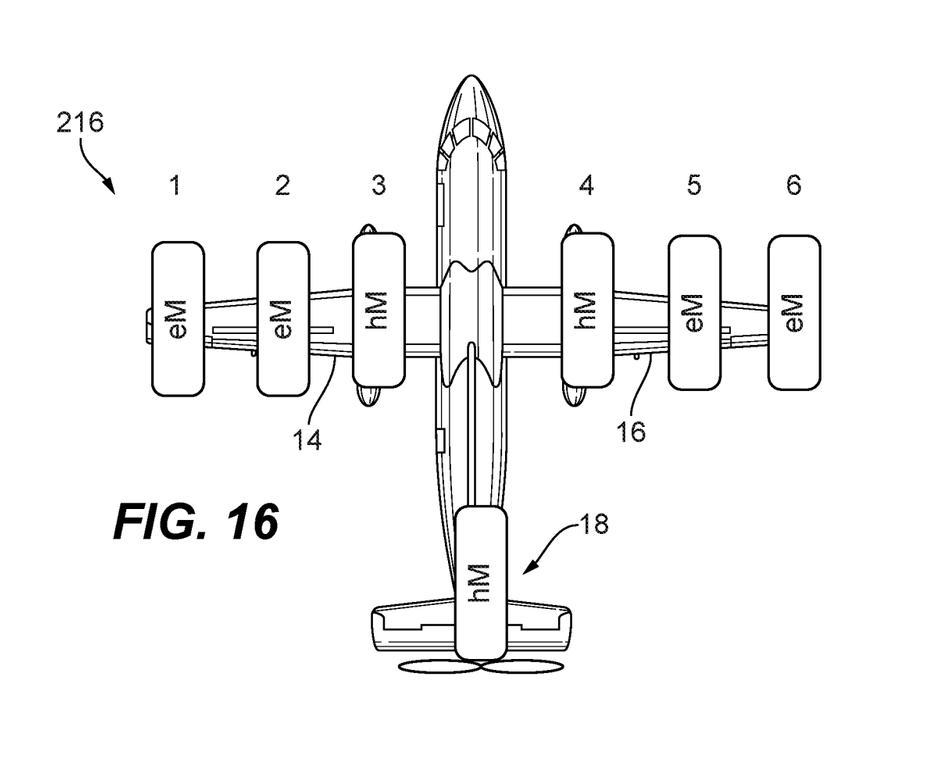
FIG. 16 is a schematic diagram of an aircraft having an inboard heat engine and two outboard electric motors located on each wing, and having a hybrid-electric propulsion system associated with the tail section of the aircraft, wherein a battery is optional.

Referring to FIG. 16, there is illustrated an aircraft 216 having two outboard electric motors eM located at positions 1 and 2 on left wing 14 and an inboard heat engine hM located at position 3 on left wing 14. Similarly, an inboard heat engine hM is located in position 4 on right wing 16 of aircraft 216 and two outboard electric motors eM are located in positions 5 and 6 on right wing 16 of aircraft 216. In addition, a hybrid-electric propulsion system HEP is associated with the tail section 18 of the aircraft 216 to deliver power to a respective air mover to propel the aircraft 216. In this embodiment of the invention, it is envisioned that a battery would be optional.

Figure 17:
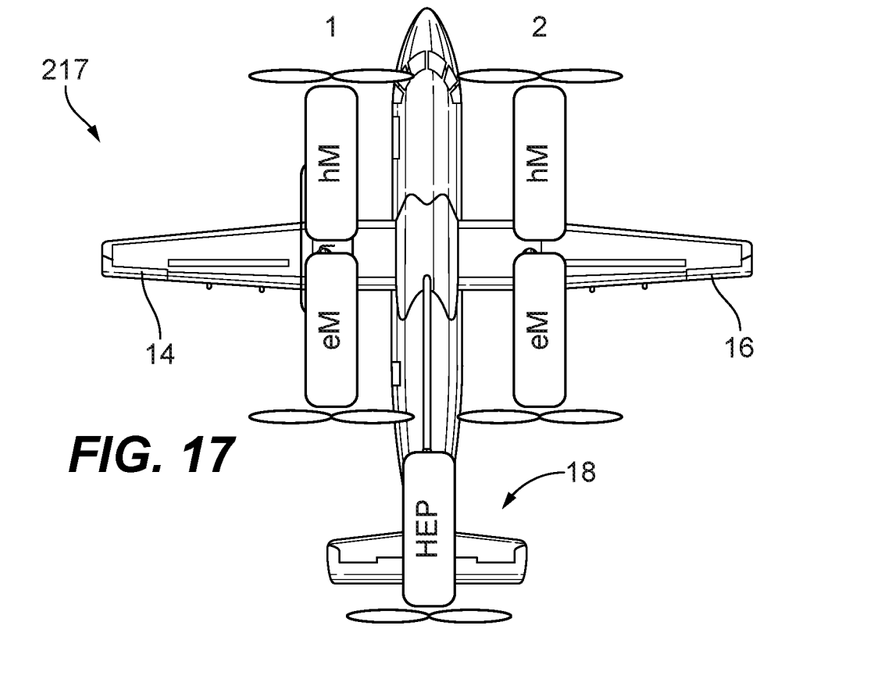
FIG. 17 is a schematic diagram of an aircraft wherein each wing has a heat motor located on the leading edge side of the wing and an electric motor located on the trailing edge side of the wing, and wherein a hybrid-electric propulsion system is associated with the tail section of the aircraft, and a battery is optional.

Referring to FIG. 17, there is illustrated an aircraft 217 having a heat motor hM located on the leading edge side of position 1 of the left wing 14 and an electric motor eM located on the trailing edge side of position 1 of the left wing 14. Similarly, a heat motor hM is located on the leading edge side of position 2 of the right wing 16 and an electric motor eM is located on the trailing edge side of position 2 of the right wing 16. In addition, a hybrid-electric propulsion system HEP is associated with the tail section 18 of the aircraft 217. In this embodiment of the invention, the hybrid-electric propulsion system HEP, each heat engine hM and each electric motor eM deliver power to a respective air mover to propel the aircraft 217. In this embodiment of the invention, it is envisioned that a battery would be optional.

Figure 18:
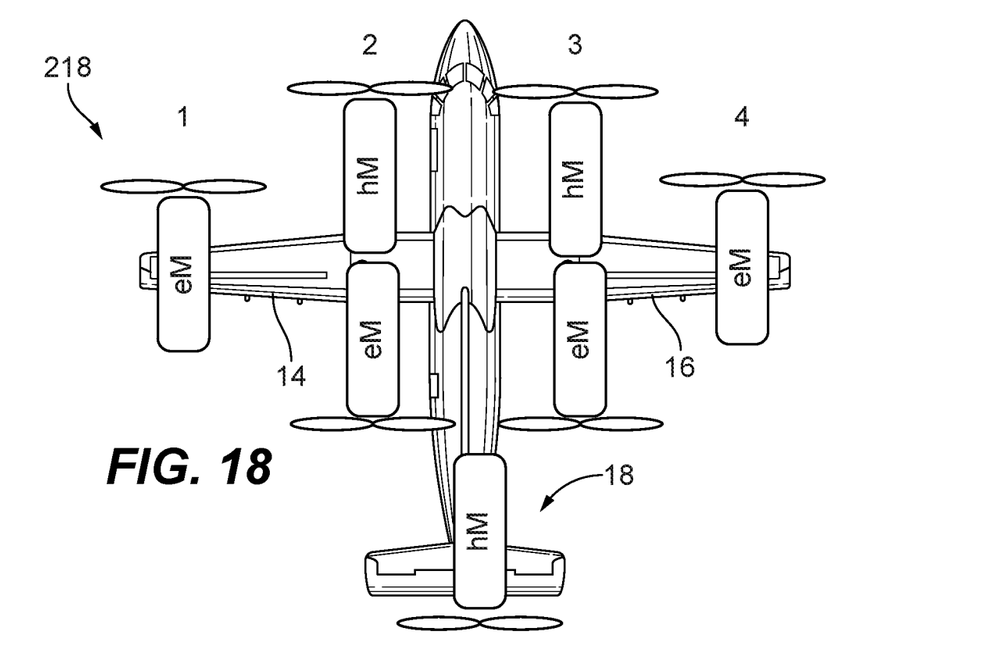
FIG. 18 is a schematic diagram of an aircraft wherein each wing has an inboard heat motor located on the leading edge side of the wing and an inboard electric motor located on the trailing edge side of the wing, along with an outboard electric motor located on each wing, and wherein a heat engine is associated with the tail section of the aircraft, and a battery is required.

Referring to FIG. 18, there is illustrated an aircraft 218 having an electric motor eM located in position 1 associated with the wing tip of the left wing 14, a heat motor hM located on the leading edge side of position 2 of the left wing 14 and an electric motor eM located on the trailing edge side of position 2 of the left wing 14. Similarly, a heat motor hM is located on the leading edge side of position 3 of the right wing 16, an electric motor eM is located on the trailing edge side of position 3 of the right wing 16, and an electric motor eM is located in position 4 associated with the wing tip of the right wing 16. In addition, a heat engine hM is associated with the tail section 18 of the aircraft 218. In this embodiment of the invention, each heat engine hM and each electric motor eM deliver power to a respective air mover to propel the aircraft 218. In this embodiment of the invention, a battery is required to provide power to the electric motors of aircraft 218.

While the subject disclosure has been shown and described with reference to preferred embodiments, those skilled in the art will readily appreciate that changes and/or modifications may be made thereto without departing from the scope of the subject disclosure.

What is claimed is:

1. An aircraft propulsion system, comprising:
   at least one hybrid-electric powerplant for delivering power to a first air mover for propelling an aircraft, wherein the at least one hybrid-electric powerplant includes a heat engine and an electric motor arranged in a parallel drive configuration to drive the first air mover, wherein the first air mover is the only air mover driven by the hybrid-electric powerplant; and
   an electric powerplant for delivering power to a second air mover for propelling the aircraft, wherein the at least one hybrid electric powerplant and the electric powerplant are connected such that if a failure of the heat engine of the electric powerplant occurs, power from a healthy heat engine of a second hybrid electric powerplant can be extracted with an electric motor of the second hybrid electric powerplant and transferred to the electric motor of the electric powerplant so as to balance load between the first air mover and the second air mover.

2. The aircraft propulsion system as recited in claim 1, wherein at least one hybrid-electric powerplant is associated with at least one wing of the aircraft.

3. The aircraft propulsion system as recited in claim 2, wherein three hybrid-electric powerplants are distributed along each wing.

4. The aircraft propulsion system as recited in claim 1, wherein the at least one hybrid-electric powerplant is associated with a tail section of the aircraft.

5. The aircraft propulsion system as recited in claim 1, wherein the heat engine is a gas turbine, a rotary engine or a reciprocating engine of any fuel type with a configuration of turbomachiney elements, selected from the group consisting of a turbocharger, turbosupercharger or supercharger and exhaust recovery turbo compounding, that is mechanically, electrically, hydraulically or pneumatically driven.

6. An aircraft propulsion system, comprising:
   at least one electric powerplant, at least one combustion powerplant, and at least one hybrid-electric powerplant including a heat engine and an electric motor, wherein each powerplant delivers power to a respective air mover for propelling an aircraft, wherein the at least one combustion powerplant is associated with a tail section of the aircraft,
   wherein the at least one hybrid electric powerplant and the at least one electric powerplant are connected such that if a failure of the heat engine of the at least one electric powerplant occurs, power from a healthy heat engine of a second hybrid electric powerplant can be extracted with an electric motor of the second hybrid electric powerplant and transferred to the electric motor of the at least one electric powerplant so as to balance load between the respective air movers.

7. The aircraft propulsion system as recited in claim 6, wherein an inboard heat engine and an outboard electric motor are associated with at least one wing of the aircraft.

8. The aircraft propulsion system as recited in claim 6, wherein an inboard heat engine and two outboard electric motors are associated with at least one wing of the aircraft, and a heat motor is associated with the tail section of the aircraft.

9. The aircraft propulsion system as recited in claim 6, wherein three electric motors are distributed along at least one wing of the aircraft, and a heat motor is associated with the tail section of the aircraft.

10. The aircraft propulsion system as recited in claim 6, wherein at least one wing has a heat motor located on a leading edge side of the wing and an electric motor located on a trailing edge side of the wing, or vice versa.

11. The aircraft propulsion system as recited in claim 6, wherein a heat engine and an electric motor are associated with the tail section of the aircraft.

12. The aircraft propulsion system as recited in claim 6, wherein heat engine and the electric motor of the hybrid electric powerplant are arranged in a parallel or an in-line drive configuration.

13. The aircraft propulsion system as recited in claim 12, wherein an inboard hybrid-electric powerplant is associated with at least one wing, an outboard electric motor is associated with each wing, and a heat engine is associated with the tail section of the aircraft.

14. The aircraft propulsion system as recited in claim 12, wherein an inboard heat engine is associated with at least one wing, two outboard electric motors are associated with each wing, and a hybrid-electric powerplant is associated with the tail section of the aircraft.

15. The aircraft propulsion system as recited in claim 12, wherein at least one wing has a heat motor located on a leading edge side of the wing and an electric motor located on a trailing edge side of the wing, and a hybrid-electric powerplant is associated with the tail section of the aircraft.

16. An aircraft propulsion system, comprising:
    a plurality of hybrid-electric powerplants for delivering power to respective air movers to propel an aircraft, wherein each hybrid-electric powerplant includes a heat engine and an electric motor that are arranged in a parallel drive configuration,; and
    a plurality of electric powerplants for delivering power to a respective air mover for propelling the aircraft,
    wherein at least one of the plurality of hybrid electric powerplants and at least one electric powerplant of the plurality of electric powerplants are connected such that if a failure of the heat engine of the at least one electric powerplant occurs, power from a healthy heat engine of a second hybrid electric powerplant can be extracted with an electric motor of the second hybrid electric powerplant and transferred to the electric motor of the at least one electric powerplant so as to balance load between the respective air movers.

17. The aircraft propulsion system as recited in claim 16, wherein propulsive power provided to the air movers is evenly distributed amongst the plurality of hybrid-electric powerplants.

18. The aircraft propulsion system as recited in claim 16, wherein propulsive power provided to the air movers is proportionally distributed amongst the plurality of hybrid-electric powerplants.

19. An aircraft propulsion system, comprising:
a plurality of powerplant locations for delivering power to respective air movers to propel the aircraft, wherein at least one powerplant location includes both:
a first powerplant at a first powerplant location having a heat engine and an electric motor arranged in a parallel drive configuration,; and
a second powerplant at a second powerplant location having an electric motor,
wherein the first powerplant and the second powerplant are connected such that if a failure of the heat engine of the first powerplant occurs, power from a healthy heat engine of the second powerplant can be extracted with an electric motor of the second powerplant and transferred to the electric motor of the first powerplant so as to balance load between the respective air movers.

20. The aircraft propulsion system as recited in claim 19, wherein propulsive power provided to the air movers is evenly distributed amongst the plurality of power plant locations.

21. The aircraft propulsion system as recited in claim 19, wherein propulsive power provided to the air movers is proportionally distributed amongst the plurality of powerplant locations.

\* \* \* \* \*